United States Patent [11] 3,575,628

[72] Inventor James C. Word, IV
Glen Burnie, Md.
[21] Appl. No. 779,076
[22] Filed Nov. 26, 1968
[45] Patented Apr. 20, 1971
[73] Assignee Westinghouse Electric Corporation
Pittsburgh, Pa.

[54] TRANSMISSIVE PHOTOCATHODE AND DEVICES UTILIZING THE SAME
9 Claims, 4 Drawing Figs.

[52] U.S. Cl. .......... 313/95, 250/213, 313/94
[51] Int. Cl. .......... H01j 39/18, H01j 31/50
[50] Field of Search .......... 313/94, 95, 108, 96; 317/234.42; 250/207, 213

[56] References Cited
UNITED STATES PATENTS

| | | | |
|---|---|---|---|
| 3,387,161 | 6/1968 | Vanlaar et al. | 313/108X |
| 3,476,593 | 11/1969 | Lehrer | 117/20X |
| 3,478,213 | 11/1969 | Simon et al. | 313/95X |
| 3,484,662 | 12/1969 | Hagon | 317/235 |

*Primary Examiner*—Roy Lake
*Assistant Examiner*—David O'Reilly
*Attorneys*—F. Shapoe, C. L. Menzemer and E. P. Klipfel

ABSTRACT: Described are transmissive gallium arsenide photocathodes, and optical devices utilizing the same, comprising gallium arsenide epitaxially deposited on a layer of silicon, the gallium arsenide having absorbed into its surface electropositive metal atoms, preferably cesium. In one embodiment of the invention, the gallium arsenide is deposited on a silicon film epitaxially deposited on a transparent sapphire substrate; while in another embodiment, the gallium arsenide is deposited on a thin silicon web having a thickness in the range of about 10 to 25 microns.

INVENTOR.
JAMES C. WORD, IV
BY
C. L. Menzemer
ATTORNEY

TRANSMISSIVE PHOTOCATHODE AND DEVICES UTILIZING THE SAME

BACKGROUND OF THE INVENTION

It is a well-known fact that all photocathodes or photoemitters exhibiting a high quantum yield in the visible part of the spectrum are semiconductors. One material suitable for such applications is heavily doped P-type gallium arsenide having on the surface thereof a monatomic layer of cesium as reported, for example, in "Solid-State Communications," Vol. 3, pages 189—193, Pergamon Press, Ltd., 1965. In order to achieve electron emission from such a photocathode, it is necessary that the gallium arsenide be in the form of a layer formed on a substrate and no greater than about 20,000 Angstrom units in thickness. In the past, substrates commonly used for this purpose comprised gallium arsenide, germanium or gallium phosphide. These substrates, however, are not transparent. Consequently, in electron-optic devices utilizing photocathodes with such substrates, it is necessary to direct the incident light against the same side of the photocathode as an anode for the electron-optic device, the emitted electrons from the cathode being "reflected" back to the anode. Needless to say, this is a cumbersome configuration and not altogether satisfactory.

From a consideration of the foregoing, it will be appreciated that it is highly desirable to utilize a substrate for the gallium arsenide which is transparent such that the light can pass through the transparent substrate and strike the gallium arsenide on one side with the electrons being emitted from the gallium arsenide on the other side where they can travel to an anode. In an effort to provide a transmissive photocathode, attempts have been made to epitaxially deposit gallium arsenide directly on transparent sapphire substrates. The difficulty with this technique, however, is that polycrystalline gallium arsenide is usually epitaxially deposited in the process; whereas, for photoemission, a single crystal layer of gallium arsenide is desired.

SUMMARY OF THE INVENTION

As one object, the present invention seeks to provide a new and improved semiconductor photoemitter wherein a semiconductive material capable of emitting electrons in response to incident light is on one side of a substrate while the incident light is directed against the other side.

Another object of the invention is to provide a semiconductor photoemitter of the type described wherein the substrate comprises sapphire having a layer of silicon epitaxially deposited thereon. This facilitates the epitaxial growth of a single crystal layer of gallium arsenide over the silicon layer.

A further object of the invention is to provide a semiconductor photoemitter comprising single crystal gallium arsenide grown on single crystal silicon webs having thicknesses in the range of about 10 to 25 microns.

Still another object of the invention is to provide new and improved electron-optic devices utilizing photocathodes of the type described above.

In accordance with the invention, a layer of silicon having a thickness in the range of about 1 to 500 Angstrom units is initially grown on one surface of a sapphire substrate by epitaxial growth techniques. Following the deposition of the single crystal silicon layer, the wafer is subjected to a subsequent epitaxial growth process wherein gallium chlorides or other gallium compounds are reacted with arsenic at the surface of the previously deposited silicon layer to form epitaxial gallium arsenide. This layer of gallium arsenide has a thickness preferably in the range of about 1 to 10,000 Angstrom units. A P-type dopant, preferably zinc, is added, possibly from the elemental state, during the epitaxial deposition process to give gallium arsenide with a carrier concentration greater than $10^{19}$ carriers per cubic centimeter. The thus-deposited gallium arsenide layer is then covered with a monatomic layer of cesium in vacuum.

In another embodiment of the invention, single crystal gallium arsenide with the proper electrical qualities is grown on an optically transparent substrate comprising a silicon web having two surfaces which are free from dislocations and a thickness in the range of about 10 to 25 microns. This substrate, being optically transparent, enables the webs to be used as a linear display photocathode.

The above and other objects and features of the invention will become apparent from the following detailed description taken in connection with the accompanying drawings which form a part of this specification, and in which.

Figure 1:
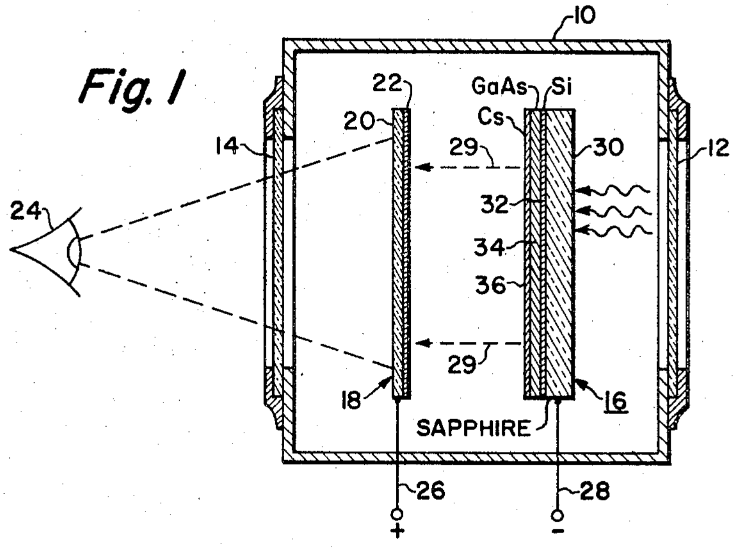
FIG. 1 is an illustration of an optical viewing device utilizing a photoemitter cathode comprising gallium arsenide deposited on a silicon layer formed on a sapphire substrate.

With reference now to the drawings, and particularly to FIG. 1, the device shown comprises an evacuated enclosure 10 having a transparent window 12 at its forward end and a second transparent window 14 at its other end. Positioned within the evacuated enclosure 10 is a photoemitting cathode 16 and an anode 18 comprising a transparent backing member 20 having a phosphorescent coating 22 on its forward face such that the phosphor will emit light which can be viewed by the eye 24 of an observer when electrons strike the phosphor coating. As shown, a source of potential is established between input terminals 26 and 28 in order that electrons liberated from the surface of the cathode 16 will be attracted to the anode 18 along the direction of arrows 29.

The anode 18, in accordance with the present invention, comprises a substrate 30 of transparent sapphire having epitaxially deposited on the left face thereof a thin layer of silicon 32, the thickness of the silicon layer being in the range of about 1 to 200 Angstrom units such that it is optically transparent. Epitaxially deposited on the silicon layer 32 is a layer of heavily doped P-type gallium arsenide which is covered by a monatomic layer of cesium 36. As will be appreciated, the thicknesses of the various layers illustrated in FIG. 1 are greatly exaggerated for purposes of illustration.

With the arrangement shown, light striking the right face of the cathode 16 will pass through the transparent substrate 30, then through the silicon layer 32, and then to the gallium arsenide layer 34 where electrons are emitted, depending upon the wavelength and intensity of the incident light. The emitted electrons, then, travel to the phosphor 22 on anode 18 and reconstruct the image.

Figure 2:
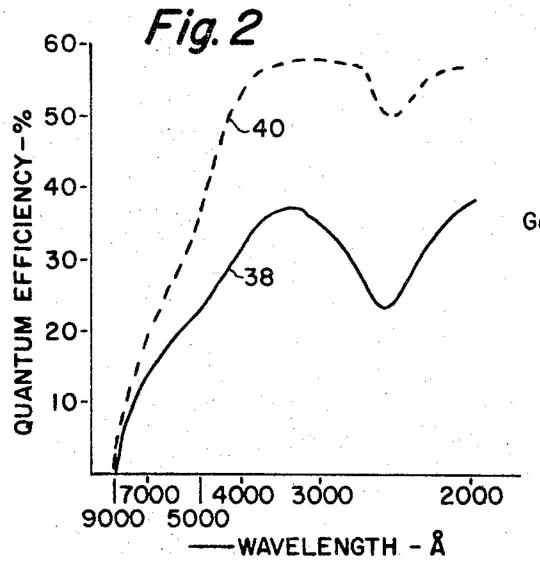
FIG. 2 is a graph showing the spectral distribution of the photoelectric yield for the photoemissive cathode of FIG. 1 using a reflective configuration.

The spectral distribution of the photoelectric yield for a reflective gallium arsenide photoemitting cathode such as that shown in FIG. 1 is illustrated in FIG. 2. The full curve 38 illustrates the efficiency in electrons per incident quantum while the dashed curve 40 illustrates the efficiency per absorbed quantum. Note that the efficiency increases rapidly as the wavelength decreases from about 9,000 Angstrom units; and this efficiency is maintained at a high level even into the far ultraviolet. Ordinarily, the visible spectrum is in the range between 4,000 and 7,000 Angstrom units. Hence, with the device of FIG. 1, not only images in the visible spectrum but also images formed by ultraviolet wavelengths and infrared wavelengths up to 9,000 Angstrom units can be viewed.

As was mentioned above, attempts have been made to epitaxially deposit gallium arsenide directly on a sapphire substrate. However, when the gallium arsenide is so deposited directly on the sapphire substrate, polycrystalline gallium arsenide results; and to date this does not facilitate efficient electron emission. For efficient electron emission, the gallium arsenide should be in the form of a single crystal; and single crystal gallium arsenide can be grown on a single crystal silicon substrate of the proper orientation, preferably the (111) or (100) orientation. Furthermore, single crystal silicon can be grown on sapphire; and, therefore, a transmissive gallium arsenide photocathode can be prepared by growing a thin layer of single crystal gallium arsenide doped to the proper carrier concentration on a thin epitaxial silicon layer which, in turn, was epitaxially deposited on a sapphire substrate.

In the manufacture of the photocathode 16, the silicon layer 32 is deposited on the sapphire substrate 30 with a conventional epitaxial deposition technique to a thickness no greater than about 200 Angstrom units. The resulting silicon layer preferably has a (111) or (100) orientation as mentioned above. In forming the gallium arsenide layer 34, the sapphire substrate 30 having the single crystal layer 32 of silicon deposited thereon is placed within an open-tube vapor phase reactor. Growth of gallium arsenide results from the formation of gallium chlorides at 800° C. by passing gaseous hydrogen chloride over elemental gallium $AsH_3$ is also decomposed in the reactor; and the gallium chlorides and $As_4$ are reacted at the surface of the silicon layer 32 to form epitaxial gallium arsenide, giving off HCl and hydrogen as exhaust products. The P-type dopant is preferably added from elemental zinc placed in the reactor at 450° C. A carrier gas of 500 milliliters per minute of hydrogen is used to carry the arsenic, gallium, and dopant to the silicon layer 32. The reactions occurring are:

$$(1)\quad 2Ga\ (\text{liquid}) + 4HCl\ (\text{gas}) \xrightarrow{800°C} GaCl_3 + GaCl + 2H_2$$

$$(2)\quad 2AsH_3\ (\text{gas}) + \text{heat} \longrightarrow \tfrac{1}{2}\ As_4 + 3H_2$$

$$(3)\quad GaCl_3 + \tfrac{1}{4}\ As_4 + \tfrac{3}{2}\ H_2 \xrightarrow{750°} GaAs + 3HCl$$

$$(4)\quad GaCl + \tfrac{1}{4}\ As_4 + \tfrac{1}{2}\ H_2 \longrightarrow GaAs + HCl$$

to give an overall "effective" reaction:

$$(5)\quad 2Ga\ (\text{liquid}) + 2AsH_3\ (\text{gas}) \longrightarrow 2GaAs + 3H_2$$

The resulting structure is then cesiated at less than $10^{19}$ torr. The absorption of cesium is continued until the sensitivity reaches a maximum. New approaches use alternate layers of cesium and oxygen to improve sensitivity and stability of the photocathode.

Figure 3:
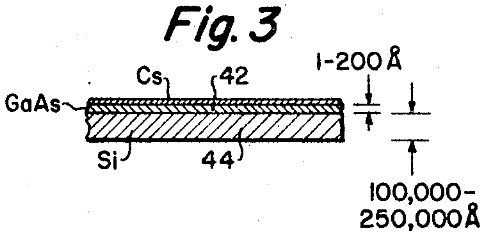
FIG. 3 is an illustration of another embodiment of the invention comprising gallium arsenide epitaxially deposited on silicon web material.

In FIG. 3, another embodiment of the invention is shown wherein the gallium arsenide layer 42 is grown directly on a transparent silicon web 44 without the use of a transparent substrate such as sapphire. The silicon web 44 comprises a thin ribbon of silicon, having a thickness of 10 to 25 microns, and two planar surfaces that are free from dislocations. At this thickness, the material is optically transparent and, hence, light rays can pass through the silicon web 44 and onto the gallium arsenide layer 42.

Figure 4:
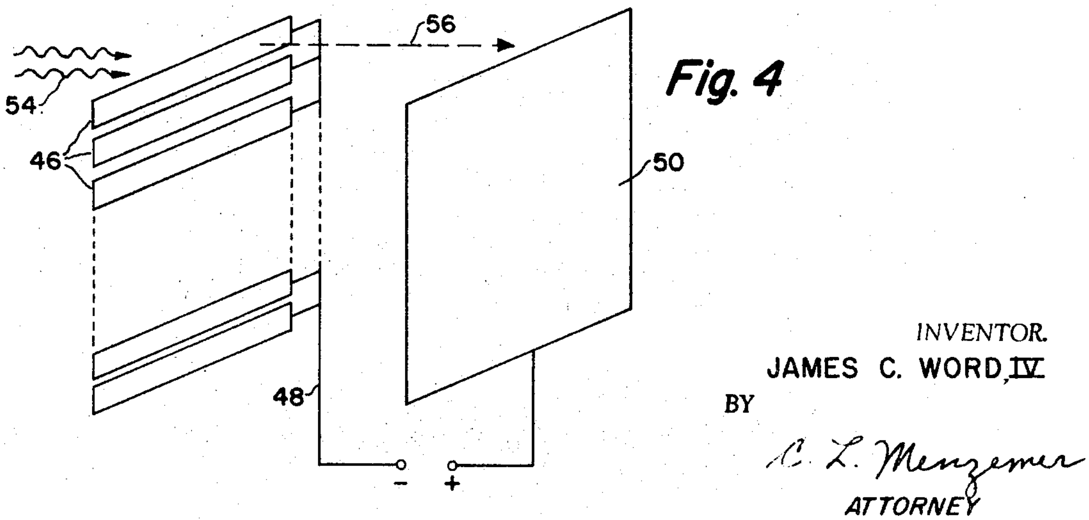
FIG. 4 is an illustration of an optical device utilizing a matrix of linear display photocathodes each comprising a silicon web having gallium arsenide deposited thereon.

An array of the silicon webs having gallium arsenide deposited thereon can be formed into a matrix as shown in FIG. 4. Thus, a plurality of silicon webs 46 arranged one above the other are all connected through lead 48 to the negative terminal of a source of potential, not shown, while the photosensitive anode 50 is connected to the positive terminal of the same source. Light rays 52 directed against the left face of the webs 46 emit electrons which travel along path 56 and strike the anode which could contain a phosphorescent coating to produce visible light and would produce an image in the same manner as explained in connection with FIG. 1. It will be appreciated, of course, that the webs 56 and the anode 50 will be disposed in an evacuated chamber as in FIG. 1.

Although the invention has been shown in connection with certain specific embodiments, it will be readily apparent to those skilled in the art that various changes in form and arrangement of parts may be made to suit requirements without departing from the spirit and scope of the invention.

I claim:

1. In an optical device, an evacuated enclosure, a photoemitting cathode within said enclosure, an anode within said enclosure having a photoemissive phosphor thereon, and means for establishing an electrical potential between said anode and cathode, said cathode comprising a single crystal gallium arsenide deposited on a transparent substrate said cathode arranged in said enclosure with said transparent substrate positioned to receive and transmit incident light which strikes the gallium arsenide on one side with electrons being emitted from the gallium arsenide on the other side.

2. The device of claim 1 wherein said transparent substrate comprises a wafer of sapphire having deposited thereon an epitaxial layer of silicon.

3. The device of claim 1 wherein said cathode comprises a plurality of silicon webs having a thickness in the range of about 10 to 25 microns with each of said webs having a layer of gallium arsenide epitaxially deposited thereon, and means for connecting said webs in parallel to said source of potential.

4. The device of claim 1 wherein said transparent substrate comprises a silicon web having a thickness in the range of about 10 to 25 microns.

5. The device of claim 1 including a monatomic layer of cesium deposited on said layer of gallium arsenide.

6. The device of claim 2 wherein said epitaxial layer of silicon is monocrystalline.

7. The device of claim 6 wherein said layer of monocrystalline silicon has a (111) orientation.

8. The device of claim 7 wherein said layer of gallium arsenide is heavily doped to greater than $10^{19}$ carriers per cubic centimeter to provide a semiconductive material of P-type conductivity.

9. The device of claim 8 wherein said silicon layer has a thickness no greater than 200 Angstrom units and said gallium arsenide layer has a thickness in the range of about 1 to 10,000 Angstrom units.